United States Patent
Kurosaki et al.

(10) Patent No.: US 10,247,264 B2
(45) Date of Patent: Apr. 2, 2019

(54) SELECTABLE ONE-WAY CLUTCH

(71) Applicant: TOYOTA JIDOSHA KABUSHIKI KAISHA, Toyota-shi, Aichi-ken (JP)

(72) Inventors: Yuki Kurosaki, Yamato (JP); Hiroyuki Shioiri, Yokohama (JP); Hiroyuki Shibata, Odawara (JP); Shotaro Kato, Sunto (JP); Mitsuaki Tomita, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/725,965

(22) Filed: Oct. 5, 2017

(65) Prior Publication Data
US 2018/0149211 A1 May 31, 2018

(30) Foreign Application Priority Data

Nov. 25, 2016 (JP) .................... 2016-229435

(51) Int. Cl.
*F16D 41/12* (2006.01)
*F16D 23/12* (2006.01)
*F16D 41/14* (2006.01)
*F16D 41/16* (2006.01)

(52) U.S. Cl.
CPC .......... *F16D 41/125* (2013.01); *F16D 23/12* (2013.01); *F16D 41/14* (2013.01); *F16D 41/16* (2013.01)

(58) Field of Classification Search
CPC ........ F16D 41/12; F16D 41/125; F16D 41/14; F16D 41/16; F16D 23/12
See application file for complete search history.

(56) References Cited

U.S. PATENT DOCUMENTS

| 7,198,587 | B2 * | 4/2007 | Samie | F16H 3/666 |
| | | | | 192/43.1 |
| 7,824,292 | B2 * | 11/2010 | Samie | F16D 25/00 |
| | | | | 475/148 |
| 2010/0022342 | A1 * | 1/2010 | Samie | F16D 41/08 |
| | | | | 475/144 |
| 2017/0276193 | A1 * | 9/2017 | Yasui | F16C 3/02 |

FOREIGN PATENT DOCUMENTS

WO     2010/011479 A2     1/2010

* cited by examiner

*Primary Examiner* — Ramya P Burgess
*Assistant Examiner* — Lillian T Nguyen
(74) *Attorney, Agent, or Firm* — Hunton Andrews Kurth LLP

(57) ABSTRACT

A selectable one-way clutch includes a fixed plate, a rotatable plate, a switching plate, an arm member, and an actuator including an operating shaft member for moving the arm member. Lubricating oil is interposed between any adjacent two of the fixed plate, the switching plate and the rotatable plate. Where a first distance is a distance from a rotation center of the switching plate to a contact point of an operating portion of the arm member and a first contact portion of the operating shaft member in normal switching operation from a disengaged state to an engaged state and a second distance is a distance from the rotation center of the switching plate to a contact point of the operating portion of the arm member and a second contact portion of the operating shaft member in switching plate erroneous operation, the second distance is larger than the first distance.

5 Claims, 8 Drawing Sheets

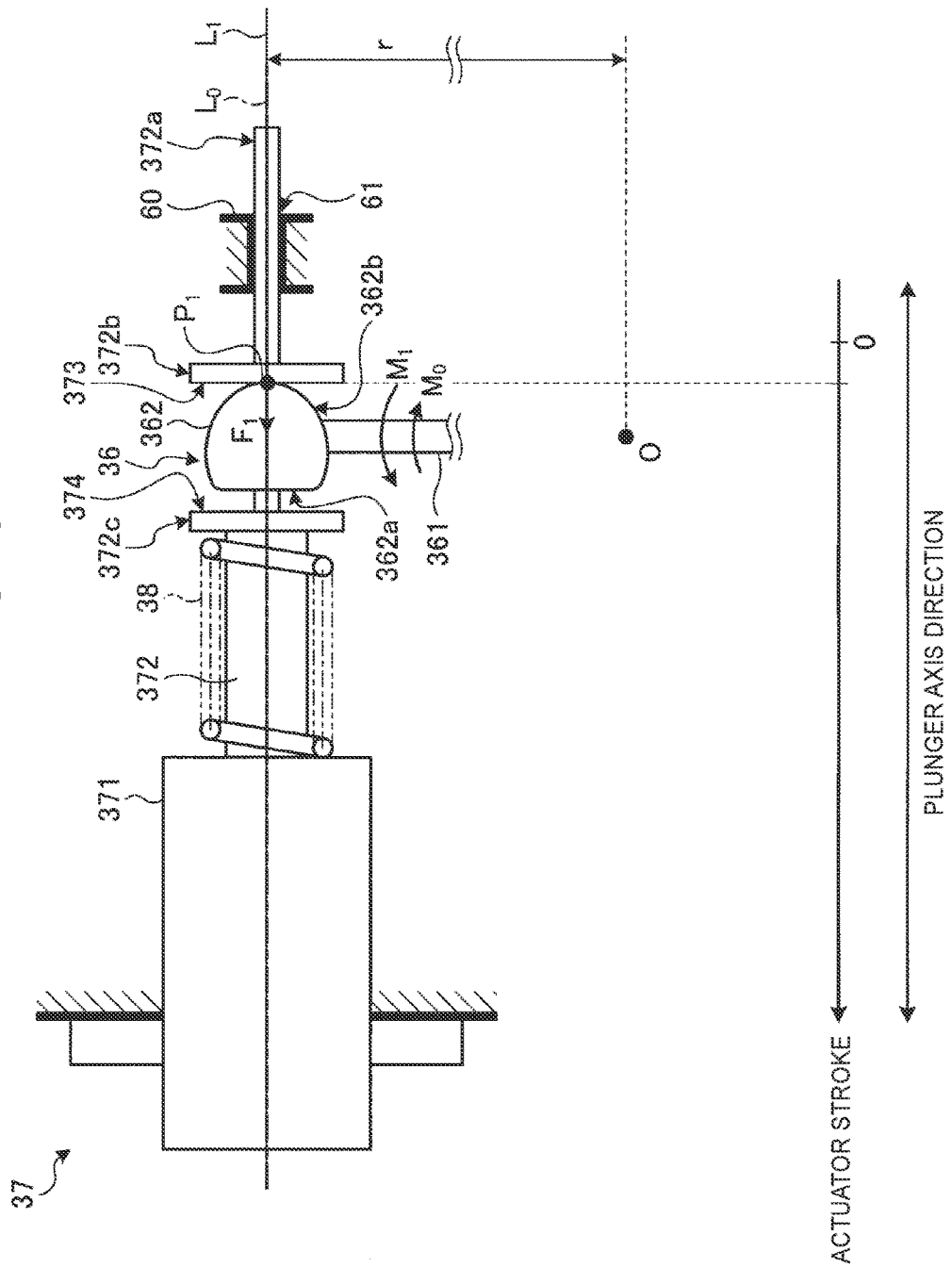

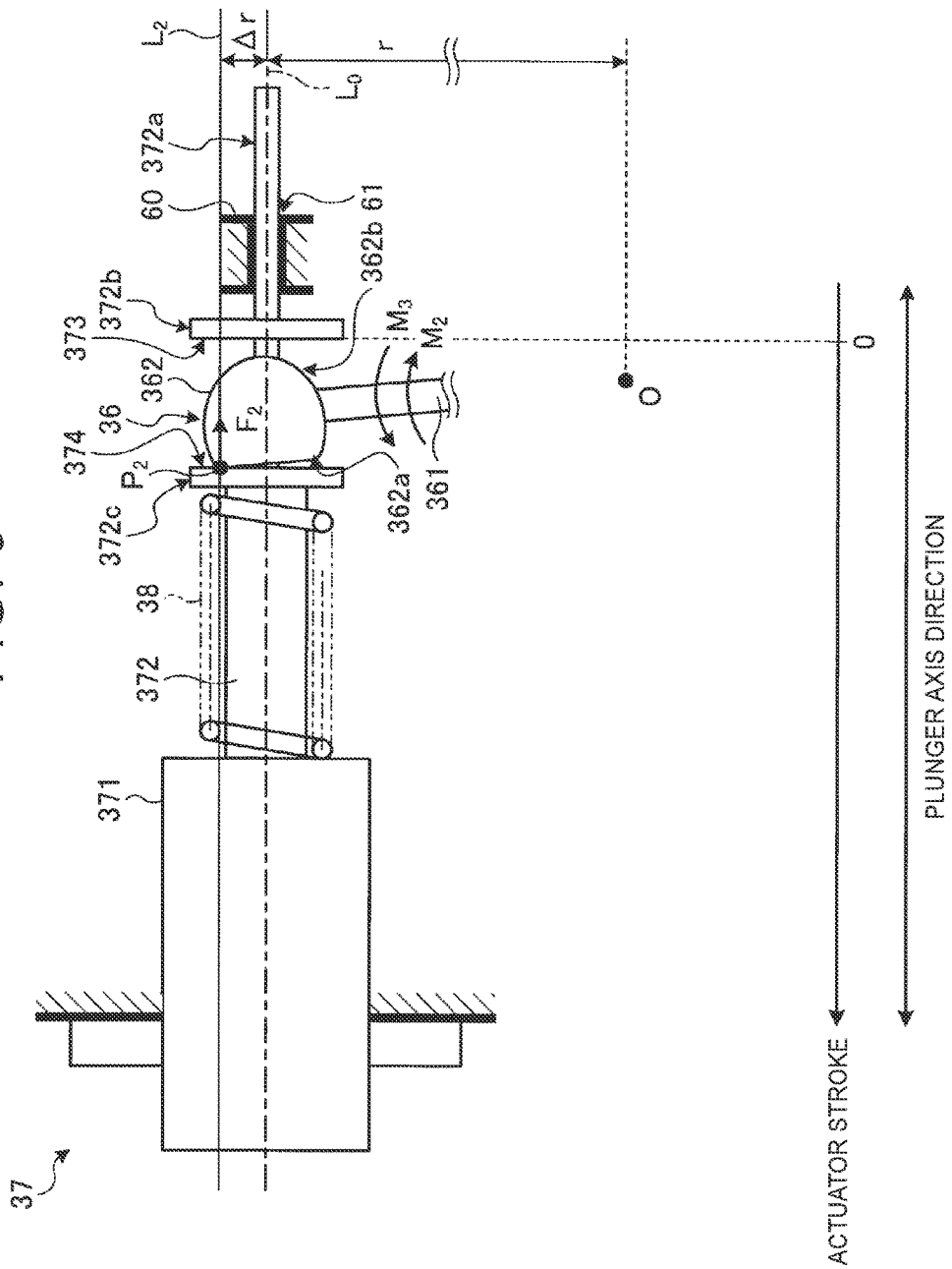

SELECTABLE ONE-WAY CLUTCH

INCORPORATION BY REFERENCE

The disclosure of Japanese Patent Application No. 2016-229435 filed on Nov. 25, 2016 including the specification, drawings and abstract is incorporated herein by reference in its entirety.

BACKGROUND

1. Technical Field

This disclosure relates to a selectable one-way clutch.

2. Description of Related Art

Conventionally, there is known a selectable one-way clutch as a one-way clutch that is installed in a vehicle. The selectable one-way clutch is able to switch the status of engagement of struts and notches between an engaged state and a disengaged state with the use of a selector plate. The selector plate is arranged between a pocket plate and a notch plate. The struts are engaging pieces of the pocket plate. The notches are engaging recesses of the notch plate. In such a selectable one-way clutch, since the selector plate slides relatively to the pocket plate or the notch plate, the plates are smoothly moved because of lubricating oil supplied to the sliding faces of the plates.

International Application Publication No. 2010/011479 describes the following configuration. In a selectable one-way clutch in which lubricating oil is supplied to between plates, an arm is coupled to the outer periphery of the selector plate in order to operate the selector plate that switches the rotational direction of the notch plate.

The selectable one-way clutch described in the International Application Publication No. 2010/011479 is configured to switch between an engaged state and a disengaged state by moving the arm coupled to the selector plate with the use of an actuator including a return spring. Since it is not required to transmit torque, for example, before a startup of an engine, the arm is urged in a disengaging direction by the urging force of the return spring such that the pocket plate and the notch plate are placed in the disengaged state.

SUMMARY

The plates of the selectable one-way clutch are configured to rotate relatively to one another. Therefore, for example, if the notch plate is rotated in a state where the pocket plate is fixed, torque acts via lubricating oil on the selector plate arranged between the pocket plate and the notch plate. This is a drag based on shear force due to the viscosity of lubricating oil. As the viscosity of lubricating oil increases, larger torque (drag torque) acts on the selector plate.

However, if the temperature of lubricating oil in the selectable one-way clutch is low at the time of, for example, a startup of an engine, the viscosity of lubricating oil is high. Therefore, the selector plate may be rotated by the drag torque, with the result that, the pocket plate and the notch plate, which are in the disengaged state, can be erroneously engaged. In the selectable one-way clutch described in the International Application Publication No. 2010/011479, in order to avoid such erroneous engagement, it is conceivable to increase the urging force of the return spring so as to resist drag torque. However, in this case, when the status of engagement is switched from the disengaged state to the engaged state, it is required to generate force that overcomes the urging force of the return spring with the use of the actuator. This leads to an increase in the size of the actuator.

The disclosure provides a selectable one-way clutch that is able to reduce erroneous engagement without increasing the size of an actuator.

A selectable one-way clutch according to the disclosure includes a fixed plate; a rotatable plate facing the fixed plate; an engaging mechanism configured to engage the fixed plate and the rotatable plate with each other; a switching plate arranged between the fixed plate and the rotatable plate, the switching plate being configured to switch a status of engagement of the fixed plate and the rotatable plate between an engaged state and a disengaged state by rotating around a central axis of the rotatable plate by a predetermined angle, the engaged state being a state where the fixed plate and the rotatable plate are engaged with each other by the engaging mechanism, the disengaged state being a state where the fixed plate and the rotatable plate are not engaged with each other by the engaging mechanism, lubricating oil being interposed between any adjacent two of the fixed plate, the switching plate and the rotatable plate; an arm member coupled to the switching plate, the arm member protruding outward in a radial direction of the switching plate; and an actuator including an operating shaft member, the operating shaft member protruding from the actuator, the operating shaft member being configured to move the arm member to between an engaged position and a disengaged position by moving the arm member along a circumferential direction of the switching plate, the engaged position being a position in which the engaged state is established, the disengaged position being a position in which the disengaged state is established. The arm member includes an operating portion that receives force in an axis direction of the operating shaft member from the operating shaft member. The operating shaft member includes a first contact portion and a second contact portion, the first contact portion and the second contact portion facing each other via the operating portion such that the second contact portion, the operating portion and the first contact portion being located in this order from a side of the actuator in the axis direction of the operating shaft member, the first contact portion and the second contact portion being used to cause force in the axis direction of the operating shaft member to act on the operating portion by contacting the operating portion, the operating shaft member including an elastic member configured to apply urging force to the operating portion via the second contact portion, the urging force are a force to move the arm member from the engaged position toward the disengaged position. The selectable one-way clutch is configured such that a first distance is larger than a second distance. The first distance is a distance from a rotation center of the switching plate to a contact point of the operating portion and the first contact portion at the time when the first contact portion and the operating portion contact each other by moving the operating shaft portion with the actuator to move the first contact portion toward the operating portion, and the second distance is a distance from the rotation center of the switching plate to a contact point of the operating portion and the second contact portion at the time when the operating portion and the second contact portion contact each other by moving the arm member from the disengaged position toward the engaged position without moving the operating shaft member with the actuator, the second distance is larger than the first distance.

In the above aspect, the operating portion may have a shape that part of a sphere is cut away, and may include a cutaway portion that faces the second contact portion in the axis direction of the operating shaft member.

Thus, with the selectable one-way clutch according to the disclosure, the operating portion is asymmetrical with respect to the axis direction of the arm member, and the distance from the contact point of the operating portion and the second contact portion from the center of the switching plate in switching plate erroneous operation is made farther than the distance from the contact point of the operating portion and the first contact portion from the rotation center of the switching plate in normal switching operation.

With the selectable one-way clutch according to the disclosure, in the switching plate erroneous operation in which the arm member moves from the disengaged position toward the engaged position without moving the operating shaft member with the actuator, it is possible to generate resistance moment larger than that in the existing art against erroneous operation of the switching plate. With this configuration, in order to suppress movement of the arm member from the disengaged position toward the engaged position in switching plate erroneous operation, it is possible to reduce the urging force of the elastic member that urges the operating portion from the engaged position toward the disengaged position. Thus, it is possible to reduce erroneous engagement without increasing the size of the actuator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a view for illustrating a normal switching operation from a disengaged state to an engaged state in the SOWC according to the embodiment; and FIG. 9 is a view for illustrating an erroneous operation of the selector plate in the SOWC according to the embodiment.

DETAILED DESCRIPTION OF EMBODIMENTS

Hereinafter, a vehicle including a selectable one-way clutch according to an embodiment to which the disclosure is applied will be described with reference to the accompanying drawings. The disclosure is not limited to the following embodiment.

Figure 1:
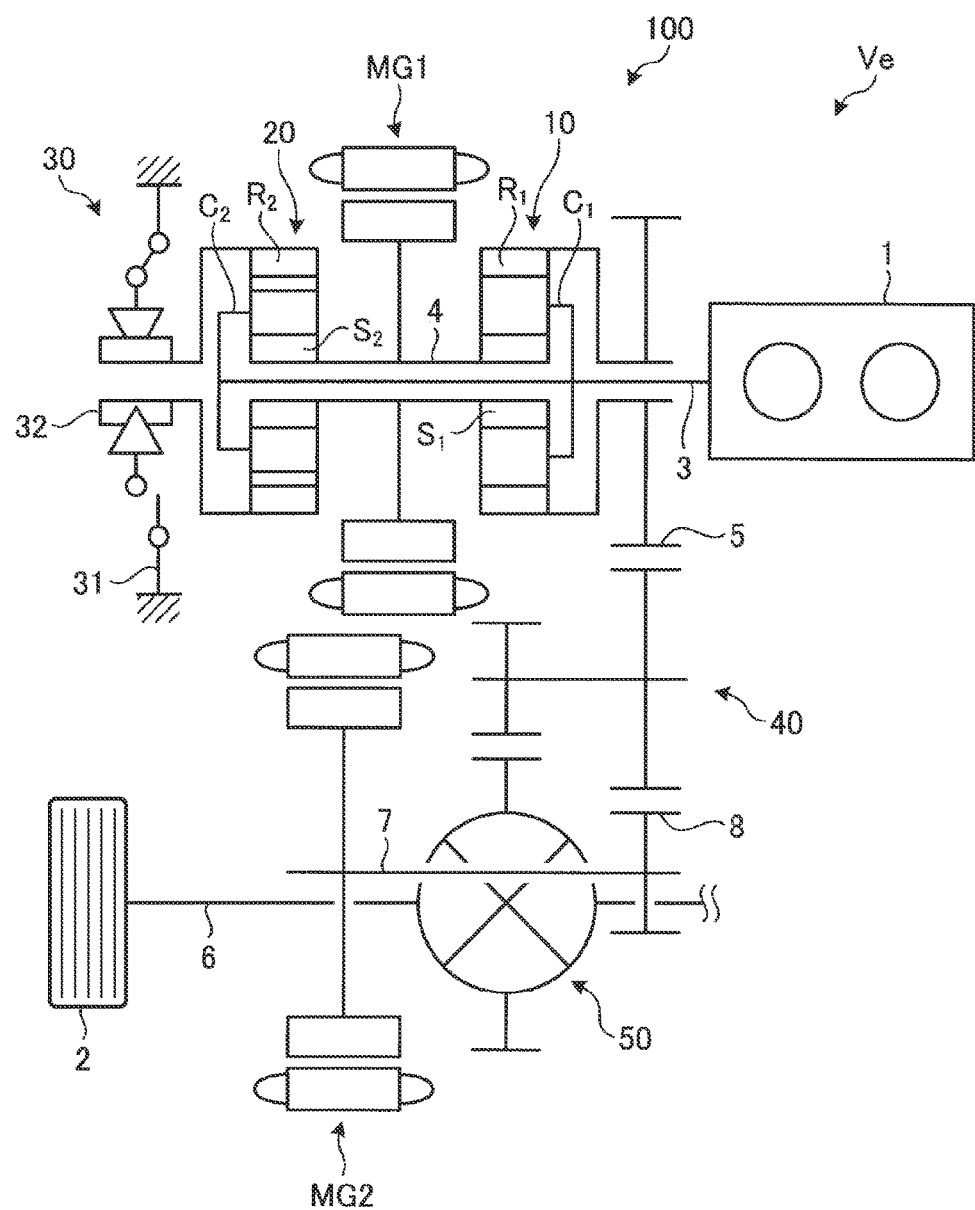
FIG. 1 is a skeletal view that shows a driving system of a vehicle in an embodiment.

FIG. 1 is a skeletal view that shows a driving system of a vehicle in the embodiment. The driving system 100 of the vehicle Ve includes an engine 1 as a power source, a first motor MG1 and a second motor MG2. The engine 1 is a known internal combustion engine. Each of the motors MG1, MG2 is a known motor generator (electric motor) having a motor function and a generator function, and is electrically connected to a battery (not shown) via an inverter (not shown).

The driving system 100 includes a first planetary gear mechanism 10, a second planetary gear mechanism 20, a selectable one-way clutch (hereinafter, referred to as "SOWC") 30, a counter gear mechanism 40, and a differential gear mechanism 50. The first planetary gear mechanism 10 serves as a power split mechanism. The second planetary gear mechanism 20 serves as a transmission unit. Power output from the engine 1 is distributed by the first planetary gear mechanism 10 between a first motor MG1 side and a drive wheel 2 side. The first motor MG1 is caused to function as a generator by using mechanical power distributed to the first motor MG1 side. Electric power generated by the first motor MG1 is charged into the battery or supplied to the second motor MG2 via the inverter. The second motor MG2 is caused to function as a motor by using the electric power. Furthermore, at the time when engine torque is transmitted to the drive wheels 2, the SOWC 30 functions as a mechanism that provides engine reaction, so the second planetary gear mechanism 20 functions as a speed-increasing device.

The crankshaft of the engine 1 is coupled to an input shaft 3 via a damper (not shown). The input shaft 3 is arranged along the same axis as the axis of the crankshaft. The damper (vibration damping device) is provided in the power transmission path between the engine 1 and the input shaft 3. The first planetary gear mechanism 10, the first motor MG1, the second planetary gear mechanism 20 and the SOWC 30 are arranged along the same axis as the axis of the input shaft 3. The second motor MG2 is arranged along an axis different from the axis of the crankshaft.

The first planetary gear mechanism 10 is a single pinion planetary gear mechanism. The first planetary gear mechanism 10 includes a first sun gear $S_1$, a first ring gear $R_1$ and a first carrier $C_1$ as three rotating elements. The first ring gear $R_1$ is arranged concentrically with respect to the first sun gear $S_1$. The first carrier $C_1$ holds pinion gears such that each pinion gear is rotatable and revolvable. Each pinion gear is in mesh with the first sun gear $S_1$ and the first ring gear $R_1$.

The first motor MG1 is coupled to the first sun gear $S_1$. The rotor shaft 4 of the first motor MG1 and the first sun gear $S_1$ rotate integrally with each other. The engine 1 is coupled to the first carrier $C_1$. The crankshaft of the engine 1, the input shaft 3 and the first carrier $C_1$ rotate integrally with one another. An output gear 5 is integrated with the first ring gear $R_1$. The output gear 5 transmits torque from the first planetary gear mechanism 10 to the drive wheel 2 side. The first ring gear $R_1$ is an output element that outputs torque, output from the engine 1, to the drive wheels 2. The output gear 5 and the first ring gear $R_1$ rotate integrally with each other.

The output gear 5 is coupled to the differential gear mechanism 50 via the counter gear mechanism 40. The drive wheels 2 are coupled to the differential gear mechanism 50 via right and left drive shafts 6.

Torque output from the second motor MG2 is allowed to be added to torque that is transmitted from the engine 1 to the drive wheels 2. The rotor shaft 7 of the second motor MG2 is arranged parallel to the input shaft 3. A reduction gear 8 is connected to the rotor shaft 7 so as to rotate integrally with the rotor shaft 7. The reduction gear 8 is in mesh with a counter driven gear of the counter gear mechanism 40.

The second planetary gear mechanism 20 is a double pinion planetary gear mechanism. The second planetary gear mechanism 20 includes a second sun gear $S_2$, a second ring gear $R_2$ and a second carrier $C_2$ as three rotating elements. The second ring gear $R_2$ is arranged concentrically with respect to the second sun gear $S_2$. The second carrier $C_2$ holds first pinion gears and second pinion gears such that each of the first pinion gears and second pinion gears is rotatable and revolvable. Each of the first pinion gears is in mesh with the second sun gear $S_2$. Each of the second pinion gears is in mesh with a corresponding one of the first pinion gears and the second ring gear $R_2$.

The first motor MG1 is coupled to the second sun gear $S_2$. The first sun gear $S_1$ of the first planetary gear mechanism 10, the rotor shaft 4 of the first motor MG1 and the second sun gear $S_2$ rotate integrally with one another. The engine 1 is coupled to the second carrier $C_2$. The first carrier $C_1$ of the first planetary gear mechanism 10, the input shaft 3 and the second carrier $C_2$ rotate integrally with one another. The second ring gear $R_2$ is a reaction element that is selectively fixed so as to be non-rotatable. The second ring gear $R_2$ is coupled to the SOWC 30 that functions as a lock mechanism. The second ring gear $R_2$ rotates integrally with a notch plate 32 of the SOWC 30.

The SOWC 30 is an engaging device (Hi-gear lock mechanism) that selectively locks the second ring gear $R_2$ such that the second ring gear $R_2$ is non-rotatable. As shown in FIG. 1, the SOWC 30 includes a pocket plate 31 and the notch plate 32. The pocket plate 31 is a fixed plate fixed to a case. The notch plate 32 is a rotatable plate. The SOWC 30 selectively switches the status of engagement of the pocket plate 31 and the notch plate 32 between an engaged state and a disengaged state. In the engaged state, the rotational direction of the second ring gear $R_2$ is restricted to only one direction. In the disengaged state, the second ring gear $R_2$ is rotatable in both directions. When the SOWC 30 is engaged, forward rotation of the second ring gear $R_2$ is restricted, and reverse rotation of the second ring gear $R_2$ is permitted. The forward rotation means that the second ring gear $R_2$ rotates in the same direction as the direction in which the crankshaft rotates during engine running. The reverse rotation means that the second ring gear $R_2$ rotates in the reverse direction with respect to the forward rotation.

In a Hi-gear lockup state, the second ring gear $R_2$ that is the reaction element is locked by the SOWC 30 so as to be non-rotatable in the forward direction. Therefore, in the Hi-gear lockup state, an over-drive state is established. In the over-drive state, the rotation speed (output rotation speed) of the first ring gear $R_1$ that is the output element is higher than the rotation speed (input rotation speed) of the first carrier $C_1$ or second carrier $C_2$ that is the input element. That is, the SOWC 30 functions as a reaction providing mechanism that provides reaction against engine torque, and the second planetary gear mechanism 20 functions as a speed-increasing device.

Furthermore, in the driving system 100, the first planetary gear mechanism 10 and the second planetary gear mechanism 20 constitute a compound planetary gear mechanism. The compound planetary gear mechanism includes a first rotating element (the first carrier $C_1$ and the second carrier $C_2$), a second rotating element (the first sun gear $S_1$ and the second sun gear $S_2$), a third rotating element (the second ring gear $R_2$) and a fourth rotating element (the first ring gear $R_1$) as four rotating elements. The first rotating element is coupled to the engine 1. The second rotating element is coupled to the first motor MG1. The third rotating element serves as a reaction element that is locked by the SOWC 30. The fourth rotating element serves as an output element that outputs torque toward the drive wheels 2. The driving system 100 is configured to function as the Hi-gear lock mechanism by engaging the SOWC 30 during engine running. The compound planetary gear mechanism is a planetary gear mechanism that distributes power, output from the engine 1, between the first motor MG1 side and the drive wheel 2 side and that has the second ring gear $R_2$ as a reaction element that is selectively fixed by the SOWC 30 so as to be non-rotatable.

Figure 2:
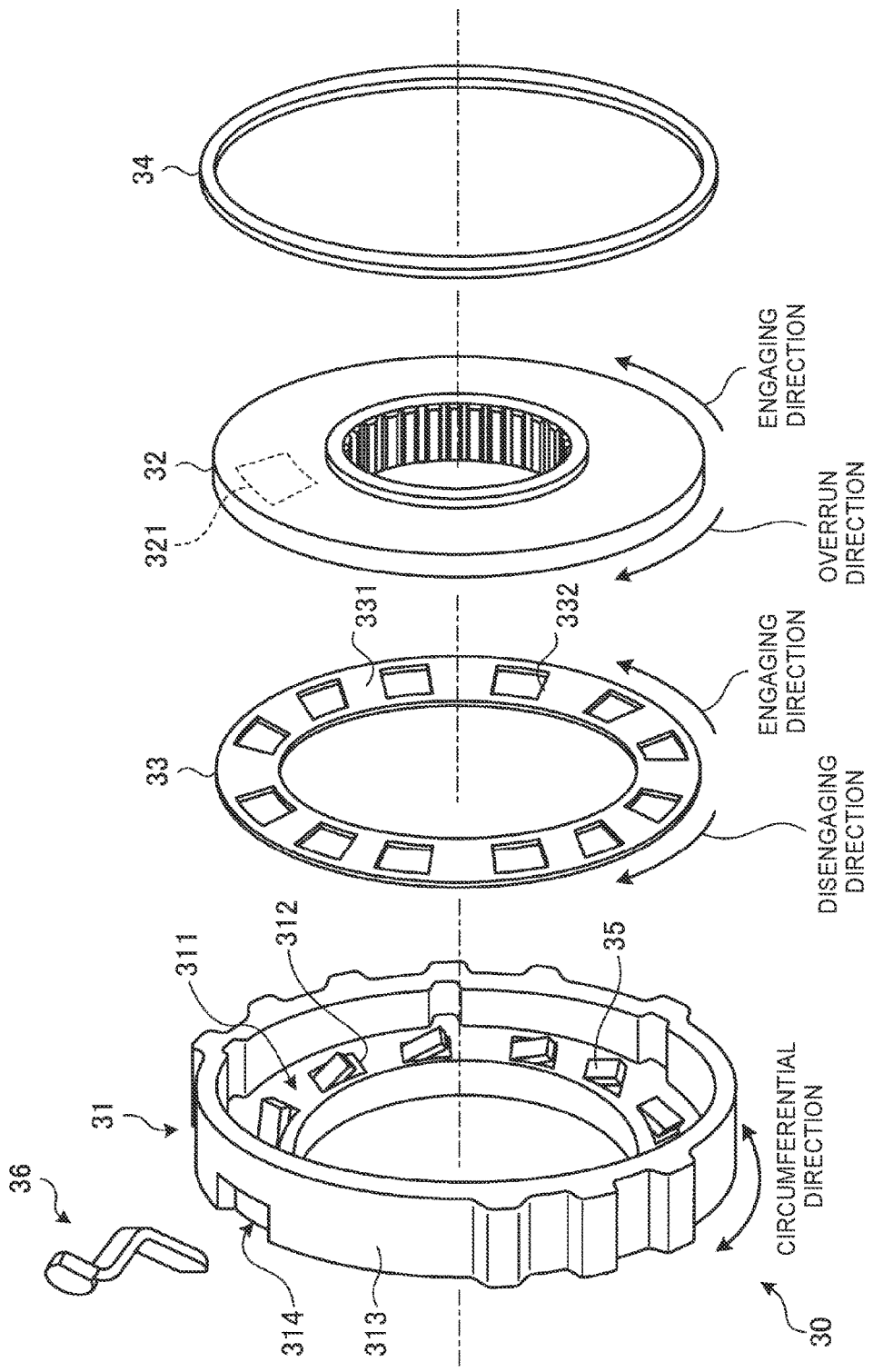
FIG. 2 is an exploded view for illustrating the overall configuration of an SOWC.
Figure 3:
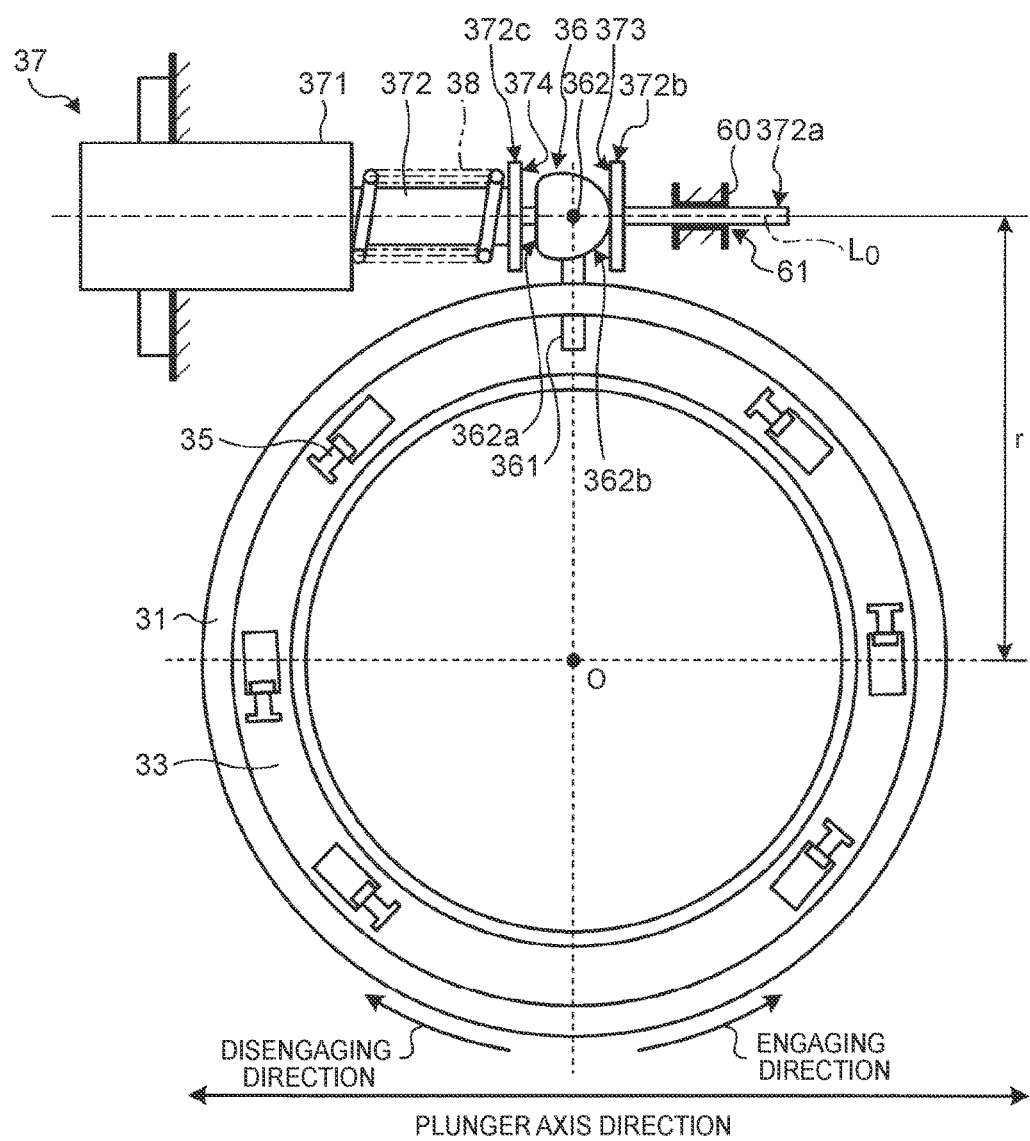
FIG. 3 is a view for illustrating the switching operation of the SOWC.

Next the detailed configuration of the SOWC 30 will be described with reference to FIG. 2 and FIG. 3. FIG. 2 is an exploded view for illustrating the overall configuration of the SOWC 30. FIG. 3 is a view for illustrating the switching operation of the SOWC 30.

As shown in FIG. 2, the SOWC 30 includes the annular pocket plate 31, the annular notch plate 32, a selector plate 33, a snap ring 34, struts (engaging pieces) 35 and an arm 36. The pocket plate 31 is a fixed plate. The notch plate 32 is a rotatable plate. The selector plate 33 is a switching plate that switches the status of engagement of the pocket plate 31 and the notch plate 32 between the engaged state and the disengaged state. The arm 36 is an arm member.

The pocket plate 31 has a disc-shaped plate portion 311 and a cylindrical portion 313. The cylindrical portion 313 is integrally formed with the plate portion 311 so as to extend in the axial direction from the outer periphery of the plate portion 311. One face of the plate portion 311 faces the selector plate 33 and the notch plate 32 in the axial direction. The plate portion 311 has a plurality of pockets 312 at positions located at predetermined intervals in the circumferential direction. Each of the pockets 312 accommodates a corresponding one of the struts 35. Each pocket 312 is recessed in the thickness direction of the plate portion 311. An urging spring (not shown) is provided between the bottom of each pocket 312 and a corresponding one of the struts 35. The urging spring urges the strut 35 toward the notch plate 32.

The notch plate 32 is an annular plate that is relatively rotatable with respect to the pocket plate 31 and the selector plate 33. One face (face that faces the selector plate 33 and the pocket plate 31 in the axial direction) of the notch plate 32 has a plurality of notches (engaging recesses) 321 at positions corresponding to the pockets 312 of the pocket plate 31. The struts 35 are engaged with the notches 321. The struts 35 and the notches 321 constitute an engaging device. In FIG. 2, only one notch 321 is shown; however, the notch plate 32 has the plurality of notches 321 at positions corresponding to the pockets 312 (struts 35). As shown in FIG. 2, the notch plate 32 is accommodated inside the cylindrical portion 313 of the pocket plate 31 together with the selector plate 33. The notch plate 32 is configured not to fall off from the pocket plate 31 with the snap ring 34 fitted to the inner periphery of the cylindrical portion 313. Oil for lubrication (lubricating oil) is interposed between any adjacent two of the pocket plate 31, selector plate 33 and notch plate 32 in the SOWC 30.

The selector plate 33 is an annular plate that is arranged between the plate portion 311 and the notch plate 32 in the rotation axis direction and that is relatively rotatable with respect to the pocket plate 31 and the notch plate 32. As shown in FIG. 2, the selector plate 33 has a plurality of windows at positions corresponding to the pockets 312 of the pocket plate 31. Each window 331 is a strut open/close window extending through the selector plate 33 in the thickness direction. The number of the windows 331 provided is the same as the number of the pockets 312 and the number of the struts 35. As shown in FIG. 3, the selector plate 33 is connected to an actuator 37 via the arm 36, and is relatively rotated with respect to the pocket plate 31 by the actuator 37. When the selector plate 33 is rotated around the central axis of the notch plate 32 by a predetermined angle between an engaged plate position and a disengaged plate position, the status of engagement of the pocket plate 31 and the notch plate 32 is switched between the engaged state and the disengaged state. In the engaged plate position, the positions of the windows 331 substantially coincide with the positions of the pockets 312 in the circumferential direction. In the disengaged plate position, the positions of the windows 331 deviate from the positions of the pockets 312 in the circumferential direction.

Figure 4:
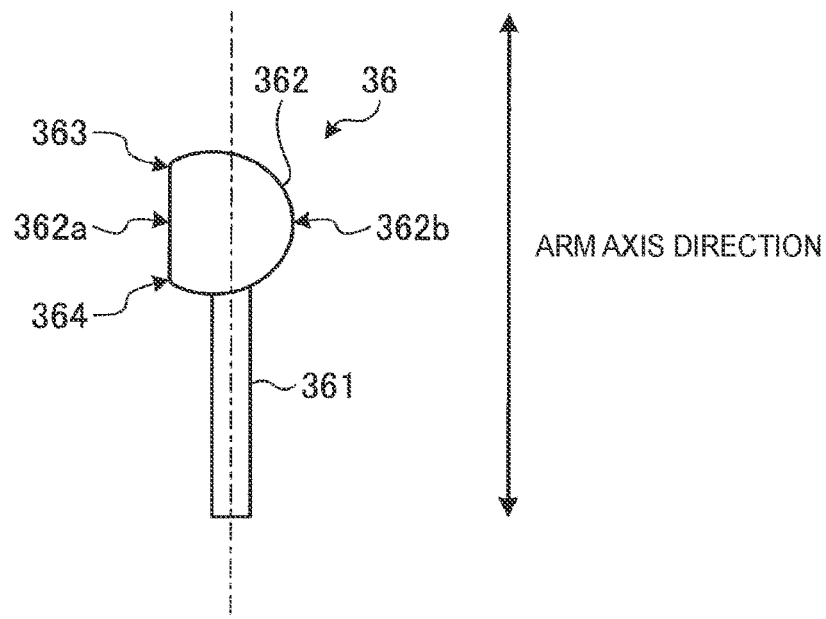
FIG. 4 is a view that schematically shows an arm that is used in the embodiment.

FIG. 4 is a view that schematically shows the arm 36 that is used in the embodiment. As shown in FIG. 4, the arm 36 is formed of an arm body 361 and an operating portion 362. The arm 36 is a member for transmitting force output from the actuator 37 to the selector plate 33. As shown in FIG. 2, the cylindrical portion 313 of the pocket plate 31 has an insertion hole 314 for inserting the arm body 361 of the arm 36. One end of the arm body 361 is inserted into the insertion hole 314 from the outer side of the cylindrical portion 313 of the pocket plate 31, and is coupled to the selector plate 33 inside the pocket plate 31. The insertion hole 314 radially extends through the proximal side (plate portion 311 side) of the cylindrical portion 313. The insertion hole 314 has such a shape that part of the cylindrical portion 313 is cut out in the circumferential direction. For this reason, the movable range of the arm body 361 inserted in the insertion hole 314 is limited in the circumferential direction by both ends (wall faces) of the insertion hole 314. That is, as the arm body 361 contacts one end (wall face) of the insertion hole 314, movement of the arm 36 is restricted, so the rotation of the selector plate 33 stops.

The other end of the arm body 361 protrudes outward in the radial direction of the selector plate 33. The arcuate operating portion 362 is formed in such a shape that part of a sphere is cut away, and provided at the other end of the arm body 361. When the operating portion 362 is viewed in plan in a selector plate rotation axis direction, the outer periphery of the operating portion 362 is formed of a chord portion 362a that is a cutaway portion and a circular arc portion 362b that is continuous with an upper end 363 and a lower end 364 that are both ends of the chord portion 362a. The operating portion 362 receives force in a plunger axis direction (the axis direction of an operating shaft member) from a plunger 372. The shape of the operating portion 362 is asymmetrical with respect to an arm axis direction. The chord portion 362a (the direction of a straight line passing through the upper end 363 and the lower end 364) is parallel to the arm axis direction.

Figure 5:
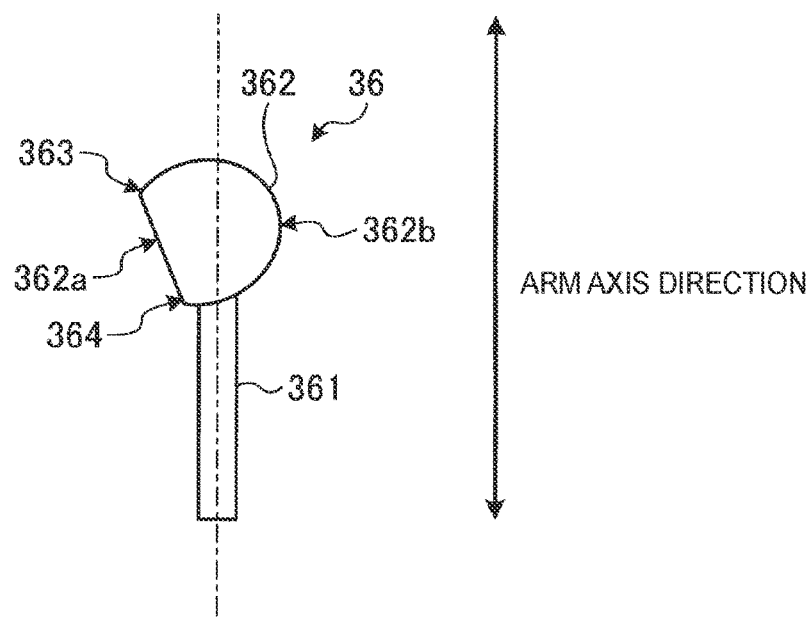
FIG. 5 is a view that schematically shows another example of the arm that is used in the embodiment.

FIG. 5 is a view that schematically shows another example of the arm 36 in the embodiment. As shown in FIG. 5, the shape of the operating portion 362 of the arm 36 may be asymmetrical with respect to the arm axis direction as follows. Part of a sphere is cut away such that the lower end 364 of the chord portion 362a is located closer to the arm axis side than the upper end 363 in the direction perpendicular to the arm axis direction, and the circular arc portion 362b that is continuous with the upper end 363 and lower end 364 of the chord portion 362a is formed.

As shown in FIG. 3, the actuator 37 is formed of an actuator body 371 and the plunger 372. An electromagnetic coil is provided inside the actuator body 371. The plunger 372 is the operating shaft member that protrudes from the actuator body 371. The actuator 37 is a direct-acting actuator that linearly moves the plunger 372. The plunger 372 is used to move the arm 36 to an engaged position or a disengaged position by moving the arm 36 along the circumferential direction of the selector plate 33. In the engaged position, the pocket plate 31 and the notch plate 32 are placed in the engaged state. In the disengaged position, the pocket plate 31 and the notch plate 32 are placed in the disengaged state. The plunger 372 includes a shaft portion 372a, a first flange 372b and a second flange 372c. The shaft portion 372a protrudes from the actuator body 371. The first flange 372b and the second flange 372c constitute a pair of flange portions that extend radially from the shaft portion 372a for causing force in the plunger axis direction to act on the operating portion 362 by contacting the operating portion 362. The first flange 372b is a first contact portion. The second flange 372c is a second contact portion.

The proximal end of the shaft portion 372a is inserted inside the actuator body 371. The distal end of the shaft portion 372a is inserted in a through-hole 61 of a support member 60 provided in the case, and is supported so as to be reciprocally movable in the plunger axis direction. The first flange 372b has a first wall face 373 that is a face facing the second flange 372c in the plunger axis direction. The second flange 372c has a second wall face 374 that is a face facing the first flange 372b in the plunger axis direction. The first flange 372b and the second flange 372c are provided in a region from the distal end side of the shaft portion 372a toward the actuator body 371 side in the plunger axis direction in order of the first flange 372b and the second flange 372c. The operating portion 362 is arranged between the first flange 372b and the second flange 372c such that the first wall face 373 and the circular arc portion 362b face each other and the second wall face 374 and the chord portion 362a face each other. When the first wall face 373 and the circular arc portion 362b contact each other or when the second wall face 374 and the chord portion 362a contact each other, the arm 36 is connected to the plunger 372.

A return spring 38 formed of a coil spring is provided between the second flange 372c and the actuator body 371 in the shaft portion 372a. The return spring 38 is an elastic member for urging the operating portion 362 via the second flange 372c with urging force that moves the arm 36 from the engaged position toward the disengaged position.

In a normal switching operation from the disengaged state to the engaged state, the actuator 37 is driven by energization to attract the plunger 372. Thus, the plunger 372 linearly moves so as to contract against the urging force of the return spring 38, the first wall face 373 of the first flange 372b and the circular arc portion 362b of the operating portion 362 contact each other, the operating portion 362 is pressed by the first flange 372b, and then the selector plate 33 rotates in the engaging direction around a selector plate rotation center O via the arm 36. The selector plate 33 rotates in the engaging direction by a predetermined angle, and then stops in the engaged plate position.

When the selector plate 33 is placed in the engaged plate position, the struts 35 are pressed by urging springs (not shown) and get upright toward the notch plate 32 side through the windows 331. Depending on the rotational direction of the notch plate 32, this case may be divided into the case (engaged state) where the struts 35 are engaged with the notches 321 and the case (overrun state) where the struts 35 are not engaged with the notches 321. In the engaged state, the rotation (forward rotation) of the notch plate 32 in the engaging direction is restricted. In the overrun state, the notch plate 32 is rotating (rotating in the reverse direction) in the overrun direction.

On the other hand, in the normal switching operation from the engaged state to the disengaged state, the actuator 37 is stopped by de-energization. Thus, when the plunger 372 linearly moves so as to extend under the urging force of the return spring 38, the second flange 372c is moved toward the operating portion 362, and the second wall face 374 of the second flange 372c and the chord portion 362a of the operating portion 362 contact each other. The operating portion 362 is pressed by the second flange 372c, the selector plate 33 rotates in the disengaging direction around the selector plate rotation center O via the arm 36, rotates in the disengaging direction by a predetermined angle, and then stops in the disengaged plate position.

When the selector plate 33 is placed in the disengaged plate position, each strut 35 is pushed into any one of the pockets 312 by a plate portion 332 between any adjacent windows 331 of the selector plate 33. Each plate portion 332 functions as a member that causes a corresponding one of the struts 35 to be accommodated inside a corresponding one of the pockets 312, and closes the opening of the corresponding pocket 312 such that the corresponding strut 35 does not get upright. In this case, since each strut 35 is not engaged with any of the notches 321, the notch plate 32 is placed in a state (disengaged state) where the notch plate 32 is rotatable in both directions.

The driving system 100 includes an electronic control unit (ECU) (not shown), and is configured to control the vehicle Ve with the use of the electronic control unit. The electronic control unit executes various computations using signals input from various sensors installed in the vehicle Ve and data saved in a storage device, and outputs command signals to the engine 1 and the actuator 37 on the basis of the computed results. For example, the electronic control unit includes an engine control unit and an SOWC control unit. The engine control unit controls fuel injection and ignition timing of the engine 1. The SOWC control unit controls the actuator 37 of the SOWC 30. The vehicle Ve is controlled by the electronic control unit to a drive mode in which the vehicle Ve is placed in the Hi-gear lockup state (over-drive state).

The operation of the SOWC 30 in the case where an arm 36A formed of an existing arm body 361A and a symmetrical operating portion 362A is used will be described.

Figure 6:
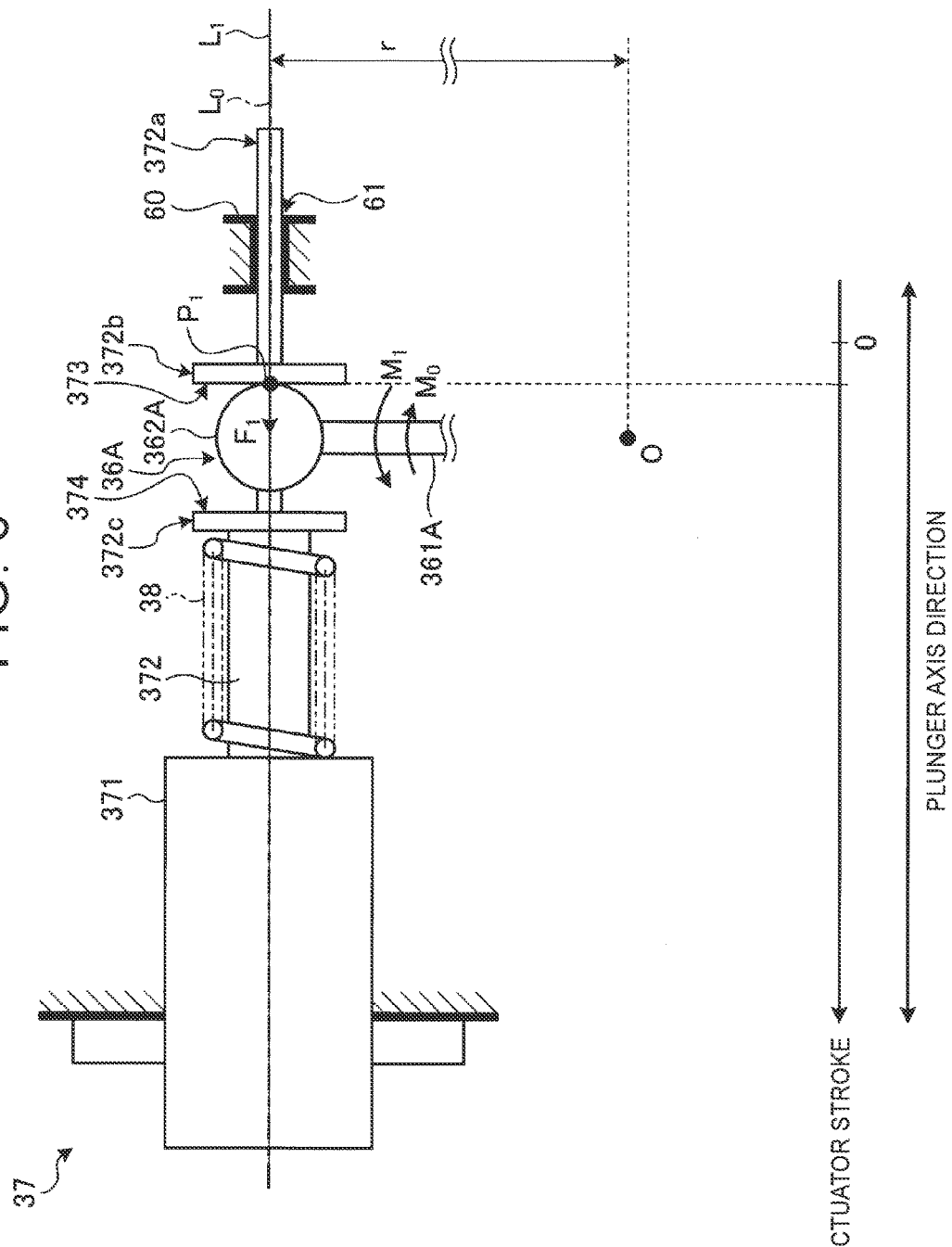
FIG. 6 is a view for illustrating a normal switching operation from a disengaged state to an engaged state in an existing SOWC.

FIG. 6 is a view for illustrating a normal switching operation from a disengaged state to an engaged state in the existing SOWC 30. The "actuator stroke" in the drawing indicates the stroke (travel in the plunger axis direction) of the first wall face 373 at the time when the plunger 372 is contracted with reference to a position at which the first wall face 373 of the first flange 372b is located in a state where the plunger 372 of the actuator 37 is extended to the maximum. In the normal switching operation from the disengaged state to the engaged state in the existing SOWC 30, the arm 36A is moved after the plunger 372 has moved as a result of energization of the actuator 37. That is, in the normal switching operation from the disengaged state to the engaged state, initially, the plunger 372 is linearly moved so as to contract against the urging force of the return spring 38 by driving the actuator 37 through energization. Thus, the first flange 372b of the plunger 372 is moved toward the operating portion 362A of the arm 36A, the first flange 372b and the operating portion 362A contact each other, and the operating portion 362A is pressed by the first flange 372b, with the result that the arm 36A rotates in the engaging direction (the counter-clockwise direction in the drawing) around the selector plate rotation center O as a rotation center.

In the plan view as shown in FIG. 6, a plunger axis $L_0$ overlaps with the line of action $L_1$ of force $F_1$ that acts on a contact point $P_1$ of the first flange 372b and the operating portion 362A, and a distance r from the selector plate rotation center O to the plunger axis $L_0$ is equal to a distance from the selector plate rotation center O to the line of action $L_1$. For this reason, the magnitude of operating moment $M_1$ that is the moment of force around the selector plate rotation center O caused by force $F_1$ is expressed by $M_1=r\times F_1$. Force $F_1$ is obtained by subtracting the urging force of the return spring 38 from a force that the actuator 37 draws the plunger 372, and acts on the operating portion 362A in the direction parallel to the plunger axis direction.

On the other hand, at the time when the actuator 37 rotates the selector plate 33 in the engaging direction, sliding resistance caused by oil occurs in the disengaging direction. However, sliding moment resistance $M_0$ that is the moment of force around the selector plate rotation center O caused by the sliding resistance is significantly smaller than the operating moment $M_1$ ($M_1 \gg M_0$). For this reason, by driving the plunger 372, the selector plate 33 is rotated in the engaging direction via the arm 36A, so it is possible to switch the status of engagement of the pocket plate 31 and the notch plate 32 from the disengaged state to the engaged state.

Figure 7:
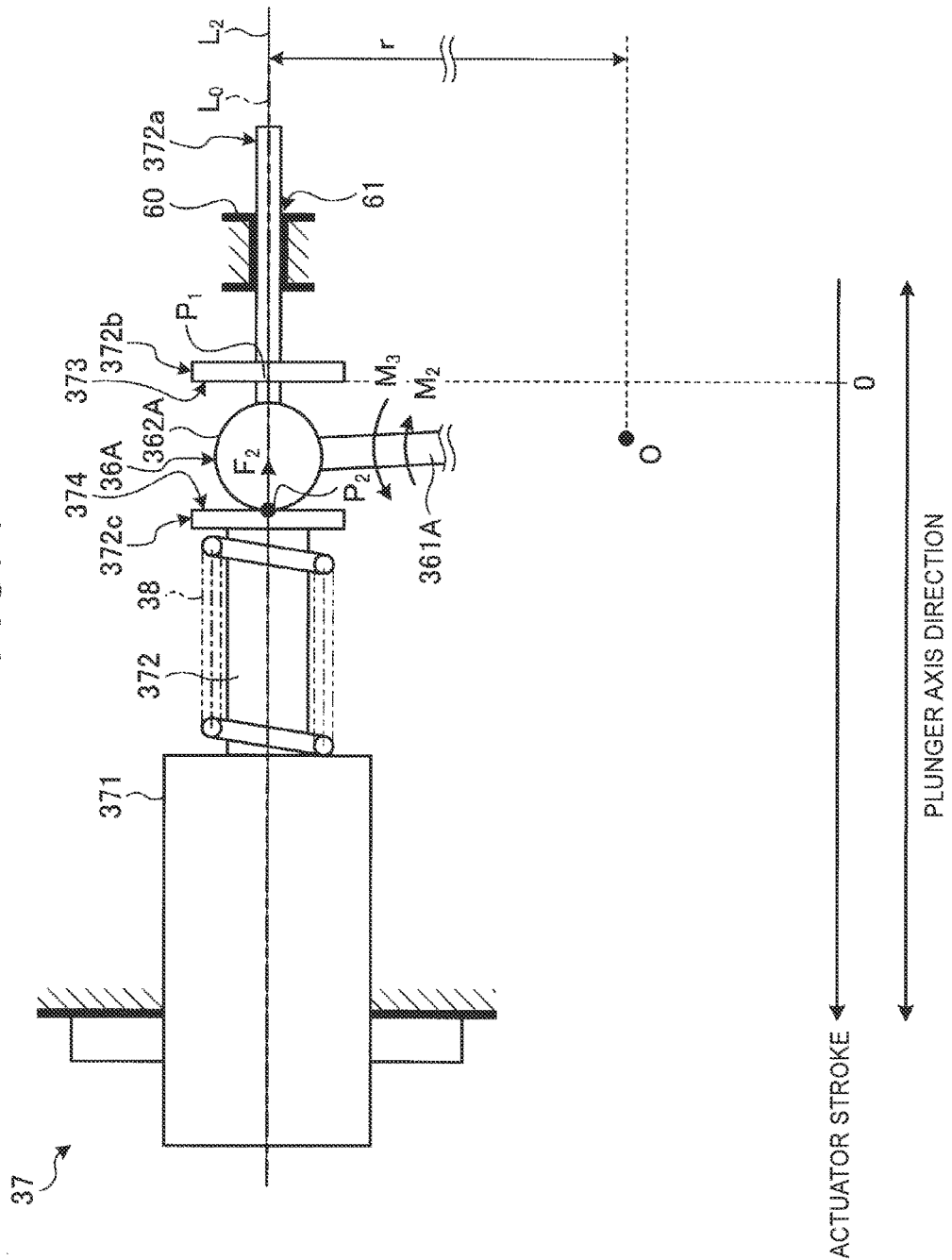
FIG. 7 is a view for illustrating an erroneous operation of a selector plate in the existing SOWC.

FIG. 7 is a view for illustrating erroneous operation of the selector plate 33 in the existing SOWC 30. In the existing SOWC 30, when the selector plate 33 erroneously operates, the plunger 372 is moved after the arm 36A has moved interlocking with the rotation of the selector plate 33 in the engaging direction. That is, at the time when the engine 1 is started in a state where the viscosity of oil inside the SOWC 30 is high and the notch plate 32 has rotated in the engaging direction, torque (erroneous operation moment $M_3$ that is the moment of force around the selector plate rotation center O) acts on the selector plate 33 via oil, and, as a result, the selector plate 33 may be dragged by the rotation of the notch plate 32 to rotate in the engaging direction and erroneously operate. In this case, the arm 36A also rotates in the engaging direction around the selector plate rotation center O as a rotation center interlocking with the rotation of the selector plate 33 in the engaging direction. Thus, the operating portion 362A of the arm 36A and the second flange 372c of the plunger 372 contact each other, and the second flange 372c is pressed by the operating portion 362A. As a result, the plunger 372 linearly moves so as to contract although the actuator 37 is not energized.

When the plunger 372 linearly moves so as to contract in this way, the return spring 38 is pressed by the second flange 372c to be compressed, and the urging force $F_2$ of the return spring 38 acts on the operating portion 362A in a direction parallel to the plunger axis direction via a contact point $P_2$ with the second flange 372c.

In the plan view as shown in FIG. 7, the plunger axis $L_0$ overlaps with the line of action $L_2$ of the urging force $F_2$ that acts on the operating portion 362A at the contact point $P_2$, and the distance r from the selector plate rotation center O to the plunger axis $L_0$ is equal to the distance from the selector plate rotation center O to the line of action $L_2$. For this reason, the magnitude of resistance moment $M_2$ that is the moment of force around the selector plate rotation center O caused by the urging force $F_2$ is expressed by $M_2=r\times F_2$. Whether erroneous operation of the selector plate 33 caused by erroneous operation moment $M_3$ stops is determined on the basis of the magnitude relation between the resistance moment $M_2$ and the erroneous operation moment $M_3$. When $M_3 > M_2$, it is not possible to stop erroneous operation if the selector plate 33 starts erroneous operation. If erroneous operation of the selector plate 33 is not able to be stopped in this way and the selector plate 33 is located in the engaged plate position, the pocket plate 31 and the notch plate 32 may be erroneously engaged with each other and the engine can fail to start.

In this way, when the arm 36A having the existing symmetrical operating portion 362A is used, as is apparent from FIG. 6 and FIG. 7, an object that contacts the operating portion 362A in the normal switching operation from the disengaged state to the engaged state is different from an object that contacts the operating portion 362A in the selector plate erroneous operation. That is, an object that contacts the operating portion 362A is the first flange 372b in the normal switching operation, and an object that contact the operating portion 362A is the second flange 372c in the selector plate erroneous operation. On the other hand, the distance from the selector plate rotation center O to the contact point $P_1$ at the time when the operating portion 362A and the first flange 372b contact each other in the normal switching operation from the disengaged state to the engaged state is equal to the distance from the selector plate rotation center O to the contact point $P_2$ at the time when the operating portion 362A and the second flange 372c contact each other in the selector plate erroneous operation. As a result, both the distance from the selector plate rotation center O to the line of action $L_1$ and the distance from the selector plate rotation center O to the line of action $L_2$ are the distance r and are equal to each other.

Next, the operation of the SOWC 30 in the case where the arm 36 having the asymmetrical operating portion 362 according to the embodiment is used will be described.

FIG. 8 is a view for illustrating the normal switching operation from the disengaged state to the engaged state in the SOWC 30 according to the embodiment. The normal switching operation from the disengaged state to the engaged state in the SOWC 30 according to the embodiment is substantially similar to the above-described normal switching operation from the disengaged state to the engaged state in the existing SOWC 30, so the detailed description thereof is omitted. In the normal switching operation from the disengaged state to the engaged state in the SOWC 30 according to the embodiment as well, in the plan view as shown in FIG. 8, the plunger axis $L_0$ overlaps with the line of action $L_1$ of force $F_1$ that acts on the contact point $P_1$ of the first wall face 373 of the first flange 372b and the circular arc portion 362b of the operating portion 362, and the magnitude of the operating moment $M_1$ that is the moment of force around the selector plate rotation center O caused by force $F_1$ is expressed by $M_1=r\times F_1$.

FIG. 9 is a view for illustrating the erroneous operation of the selector plate 33 in the SOWC 30 according to the embodiment. In the SOWC 30 according to the embodiment, when the selector plate 33 erroneously operates, in a state where the plunger 372 is not moved by the actuator 37, the arm 36 moves interlocking with the rotation of the selector plate 33 in the engaging direction and then the plunger 372 is moved. That is, at the time when the engine is started in a state where the viscosity of oil inside the SOWC 30 is high and the notch plate 32 rotates in the engaging direction, torque (the erroneous operation moment $M_3$ that is the moment of force around the selector plate rotation center O) acts on the selector plate 33 via oil, and, as a result, the selector plate 33 may be dragged by the rotation of the notch plate 32 to rotate in the engaging direction and erroneously operate. In this case, the arm 36 also rotates in the engaging direction around the selector plate rotation center O as a rotation center interlocking with the rotation of the selector plate 33 in the engaging direction. Thus, when the chord portion 362a of the operating portion 362 and the second wall face 374 of the second flange 372c contact each other and the second flange 372c is pressed by the operating portion 362, the plunger 372 linearly moves so as to contract although the actuator 37 is not energized.

When the plunger 372 linearly moves so as to contract in this way, the return spring 38 is pressed to be compressed by the second flange 372c, and the urging force $F_2$ of the return spring 38 acts on the operating portion 362 via the contact point $P_2$ of the second wall face 374 of the second flange 372c and the chord portion 362a in the direction parallel to the plunger axis direction.

The distance from the selector plate rotation center O to the contact point $P_2$ at the time when the operating portion 362 and the second flange 372c contact each other in the selector plate erroneous operation is larger than the distance from the selector plate rotation center O to the contact point $P_1$ at the time when the operating portion 362 and the first flange 372b contact each other in the normal switching operation from the disengaged state to the engaged state. For this reason, in plan view as shown in FIG. 9, the line of action $L_2$ of the urging force $F_2$ that acts on the operating portion 362 at the contact point $P_2$ is farther from the selector plate rotation center O than the plunger axis $L_0$. The distance from the selector plate rotation center O to the line of action $L_2$ is a distance $(r+\Delta r)$ larger by a distance $\Delta r$ than the distance r from the selector plate rotation center O to the plunger axis $L_0$, so the magnitude of the resistance moment $M_2$ that is the moment of force around the selector plate rotation center O caused by the urging force $F_2$ is expressed by $M_2=(r+\Delta r)\times F_2$.

The resistance moment $M_2$ caused by the urging force $F_2$ in the selector plate erroneous operation in the case where the above-described arm 36A having the existing symmetrical operating portion 362A is used is expressed by $M_2=r\times F_2$. For this reason, when the arm 36 having the asymmetrical operating portion 362 according to the embodiment is used, a margin of an increase in resistance moment for the selector plate erroneous operation is $\Delta r\times F_2$ as compared to the case where the arm 36A having the existing symmetrical operating portion 362A is used, and the rate of increase in resistance moment for the selector plate erroneous operation is expressed by $1+(\Delta r/r)$.

Thus, when the arm 36 having the asymmetrical operating portion 362 according to the embodiment is used, the resistance moment $M_2$ larger than the resistance moment $M_2$ in the case where the arm 36A having the existing symmetrical operating portion 362A is used is obtained, and force that erroneously operates the selector plate 33 reduces accordingly. For this reason, in order to reduce movement of the arm 36 from the disengaged position toward the engaged position in the selector plate erroneous operation, it is possible to reduce the urging force of the return spring 38 that urges the operating portion 362 from the engaged position toward the disengaged position. This suppresses an increase in the size of the actuator 37 due to an increase in the force of the actuator 37, which overcomes the urging force, resulting from strengthening of the return spring 38 as compared to when the arm 36A having the existing symmetrical operating portion 362A is used. Therefore, it is possible to reduce erroneous engagement of the pocket plate 31 with the notch plate 32 while reducing deterioration of mountability of the actuator 37.

What is claimed is:
1. A selectable one-way clutch comprising:
a fixed plate;
a rotatable plate facing the fixed plate;

an engaging mechanism configured to engage the fixed plate and the rotatable plate with each other;

a switching plate arranged between the fixed plate and the rotatable plate, the switching plate being configured to switch a status of engagement of the fixed plate and the rotatable plate between an engaged state and a disengaged state by rotating around a central axis of the rotatable plate by a predetermined angle, the engaged state being a state where the fixed plate and the rotatable plate are engaged with each other by the engaging mechanism, the disengaged state being a state where the fixed plate and the rotatable plate are not engaged with each other by the engaging mechanism, lubricating oil being interposed between any adjacent two of the fixed plate, the switching plate and the rotatable plate;

an arm member coupled to the switching plate, the arm member protruding outward in a radial direction of the switching plate; and an actuator including an operating shaft member, the operating shaft member protruding from the actuator, the operating shaft member being configured to move the arm member to between an engaged position and a disengaged position by moving the arm member along a circumferential direction of the switching plate, the engaged position being a position in which the engaged state is established, the disengaged position being a position in which the disengaged state is established, the arm member including an operating portion that receives force in an axis direction of the operating shaft member from the operating shaft member, the operating shaft member including a first contact portion and a second contact portion, the first contact portion and the second contact portion facing each other via the operating portion such that the second contact portion, the operating portion and the first contact portion being located in this order from a side of the actuator in the axis direction of the operating shaft member, the first contact portion and the second contact portion being used to cause force in the axis direction of the operating shaft member to act on the operating portion by contacting the operating portion, the operating shaft member including an elastic member configured to apply urging force to the operating portion via the second contact portion, the urging force being a force to move the arm member from the engaged position toward the disengaged position, the selectable one-way clutch configured such that a first distance is larger than a second distance, the first distance being a distance from a rotation center of the switching plate to a contact point of the operating portion and the first contact portion at the time when the first contact portion and the operating portion contact each other by moving the operating shaft portion with the actuator to move the first contact portion toward the operating portion, and the second distance being a distance from the rotation center of the switching plate to a contact point of the operating portion and the second contact portion at the time when the operating portion and the second contact portion contact each other by moving the arm member from the disengaged position toward the engaged position without moving the operating shaft member with the actuator, the second distance is larger than the first distance.

2. The selectable one-way clutch according to claim 1, wherein
the operating portion has a shape that part of a sphere is cut away, and the operating portion includes a cutaway portion that faces the second contact portion in the axis direction of the operating shaft member.

3. The selectable one-way clutch according to claim 2, wherein
a shape of the operating portion when viewed in a rotation axis direction of the switching plate is asymmetrical with respect to an axis direction of the arm member.

4. The selectable one-way clutch according to claim 3, wherein
the cutaway portion is a face parallel to the axis direction of the arm member.

5. The selectable one-way clutch according to claim 3, wherein
a lower end of the cutaway portion is located closer to an axis of the arm member than an upper end of the cutaway portion.

* * * * *